(12) United States Patent
Kanuparthy et al.

(10) Patent No.: US 11,741,096 B1
(45) Date of Patent: Aug. 29, 2023

(54) GRANULAR PERFORMANCE ANALYSIS FOR DATABASE QUERIES

(71) Applicant: Amazon Technologies, Inc., Seattle, WA (US)

(72) Inventors: Partha V. Kanuparthy, Sunnyvale, CA (US); Bhaven Avalani, Cupertino, CA (US); Yousuf Hussain Syed Mohammad, Seattle, WA (US); James Thomas Kiraly, Seattle, WA (US); Kaituo Li, Seattle, WA (US); Joydeep Sinha, Seattle, WA (US); John Benjamin Tobler, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 600 days.

(21) Appl. No.: 15/889,106

(22) Filed: Feb. 5, 2018

(51) Int. Cl.
*G06F 16/00* (2019.01)
*G06F 16/2453* (2019.01)
*G06F 16/951* (2019.01)

(52) U.S. Cl.
CPC .............. *G06F 16/2453* (2019.01); *G06F 16/951* (2019.01)

(58) Field of Classification Search
CPC .............. G06F 11/3466; G06F 11/3409; G06F 11/3447; G06F 16/2453; G06F 16/2454; G06F 16/24542
USPC .................................................. 707/719-720
See application file for complete search history.

(56) References Cited

U.S. PATENT DOCUMENTS

| | | | |
|---|---|---|---|
| 8,156,378 B1 | 4/2012 | Suit | |
| 10,095,759 B1* | 10/2018 | Cappiello | G06F 16/24542 |
| 10,324,783 B1 | 6/2019 | Saha et al. | |
| 10,452,383 B1 | 10/2019 | Maibach et al. | |
| 2003/0065986 A1* | 4/2003 | Fraenkel et al. | G06F 11/3089 714/47.2 |
| 2004/0250163 A1 | 12/2004 | Roddy et al. | |
| 2005/0055673 A1 | 3/2005 | Dias et al. | |
| 2005/0131893 A1* | 6/2005 | Von Glan | G06F 16/24532 |

(Continued)

FOREIGN PATENT DOCUMENTS

EP    3447660 A1    2/2019

OTHER PUBLICATIONS

Eno Thereska, et al "Stardust: Tracking Activity in a Distributed Storage System", Proceedings of the Joint International Conference on Measurement and Modeling of Computer Systems (SIGMETRICS'06), Jun. 26-30, 2006, Pages 1-12.

(Continued)

*Primary Examiner* — Thu Nguyet T Le
(74) *Attorney, Agent, or Firm* — S. Scott Foster; Kowert, Hood, Munyon, Rankin & Goetzel, P.C.

(57) ABSTRACT

Granular performance analysis may be performed for database queries. Database query performance may be monitored. For some database queries, performance of portions of the database query may be measure. The measure performance of the portions may be compared with performance goals that correspond to the portions of the database query. Portions that do not meet or exceed the corresponding performance goals may be identified so that an indication of the identified portions may be provided.

20 Claims, 9 Drawing Sheets

(56) References Cited

U.S. PATENT DOCUMENTS

| | | | |
|---|---|---|---|
| 2006/0188862 A1 | 8/2006 | Johnson | |
| 2007/0038838 A1 | 2/2007 | Greis et al. | |
| 2008/0133458 A1 | 6/2008 | Zabback et al. | |
| 2008/0140734 A1 | 6/2008 | Wagner | |
| 2008/0195577 A1 | 8/2008 | Fan et al. | |
| 2008/0262890 A1 | 10/2008 | Korupolu et al. | |
| 2009/0164443 A1 | 6/2009 | Ramos et al. | |
| 2010/0145929 A1 | 6/2010 | Burger et al. | |
| 2012/0221898 A1 | 8/2012 | Suit | |
| 2013/0031424 A1 | 1/2013 | Srivastava et al. | |
| 2013/0103670 A1* | 4/2013 | Kashyap | G06F 9/3885 707/714 |
| 2014/0214798 A1* | 7/2014 | Nica et al. | G06F 16/24542 707/718 |
| 2014/0358828 A1 | 12/2014 | Phillipps et al. | |
| 2015/0039555 A1 | 2/2015 | Rao | |
| 2015/0089270 A1 | 3/2015 | Jeong et al. | |
| 2016/0299827 A1 | 10/2016 | Wilkinson et al. | |
| 2017/0004173 A1* | 1/2017 | Simitsis et al. | G06F 16/24542 |
| 2017/0083576 A1 | 3/2017 | Guan et al. | |
| 2017/0123889 A1 | 5/2017 | Haridas et al. | |
| 2017/0200091 A1 | 7/2017 | Britton et al. | |
| 2018/0039674 A1* | 2/2018 | Seyvet et al. | G06F 16/24535 |
| 2018/0091528 A1* | 3/2018 | Shahbaz et al. | H04L 63/1458 |
| 2018/0191770 A1 | 7/2018 | Nachenberg et al. | |
| 2019/0095470 A1 | 3/2019 | Dundjerski et al. | |
| 2019/0102693 A1 | 4/2019 | Yates et al. | |
| 2019/0236194 A1* | 8/2019 | James et al. | G06F 16/901 |

OTHER PUBLICATIONS

Gang Luo, et al, "Toward a Progress Indicator for Database Queries", ACM, SIGMOD 2004, Jun. 13-18, 2004, Pages 1-12.

Shivnath Babu, et al, "Diads: Addressing the "My-Problem-or-Yours" Syndrome with Integrated SAN and Database Diagnosis", 7th USENIX Conference on File and Storage Technologies, Feb. 2009, Pages 57-70.

Surajit Chaudhuri, et al, "Estimating Progress of Execution for SQL Queries", ACM, SIGMOD 2004, Jun. 13-18, 2004, Pages 803-814.

U.S. Appl. No. 15/889,101, Filed Feb. 5, 2018, Partha V. Kanuparthy et al.

\* cited by examiner

GRANULAR PERFORMANCE ANALYSIS FOR DATABASE QUERIES

BACKGROUND

As the technological capacity for organizations to create, track, and retain data continues to grow, a variety of different technologies for managing the rising tide of information have been developed. Database and other data store technologies, for example, have implemented support for querying languages and protocols that allow users to search for and modify data stored in a large data set by submitting queries. Because the amount of data accessed by queries is growing, minimizing the amount of time and other resources consumed to perform queries is increasingly important. Performance analysis of queries may help users to understand the causes of query performance in order to allow users or other components to make adjustments to improve query performance.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various embodiments of granular performance analysis for database queries are described herein. Performance metrics for database queries offer users, control systems, and other stakeholders some insight into the way in which a query engine or other system that provides access to data by processing database queries, in some embodiments. For instance, processor utilization, storage access speed, or other metrics describing query performance can be used to assess whether queries are performing as desired, in some embodiments. However, granular performance analysis for database queries may offer further insight into the performance of queries by identifying particular portions of query performance that may cause or otherwise affect the overall performance of a query, in some embodiments, so that remedial or other changes made to further improve performance of a query may not exacerbate existing performance problems or create new ones in an attempt to improve query performance. For example, granular query performance analysis may provide accurate root causes analysis of the operations, tasks, or conditions that determine performance of a query, preventing false positive diagnoses of problems or conditions and/or reducing database downtime for troubleshooting to find out the cause of a performance problem for a query, in some embodiments.

Figure 1:
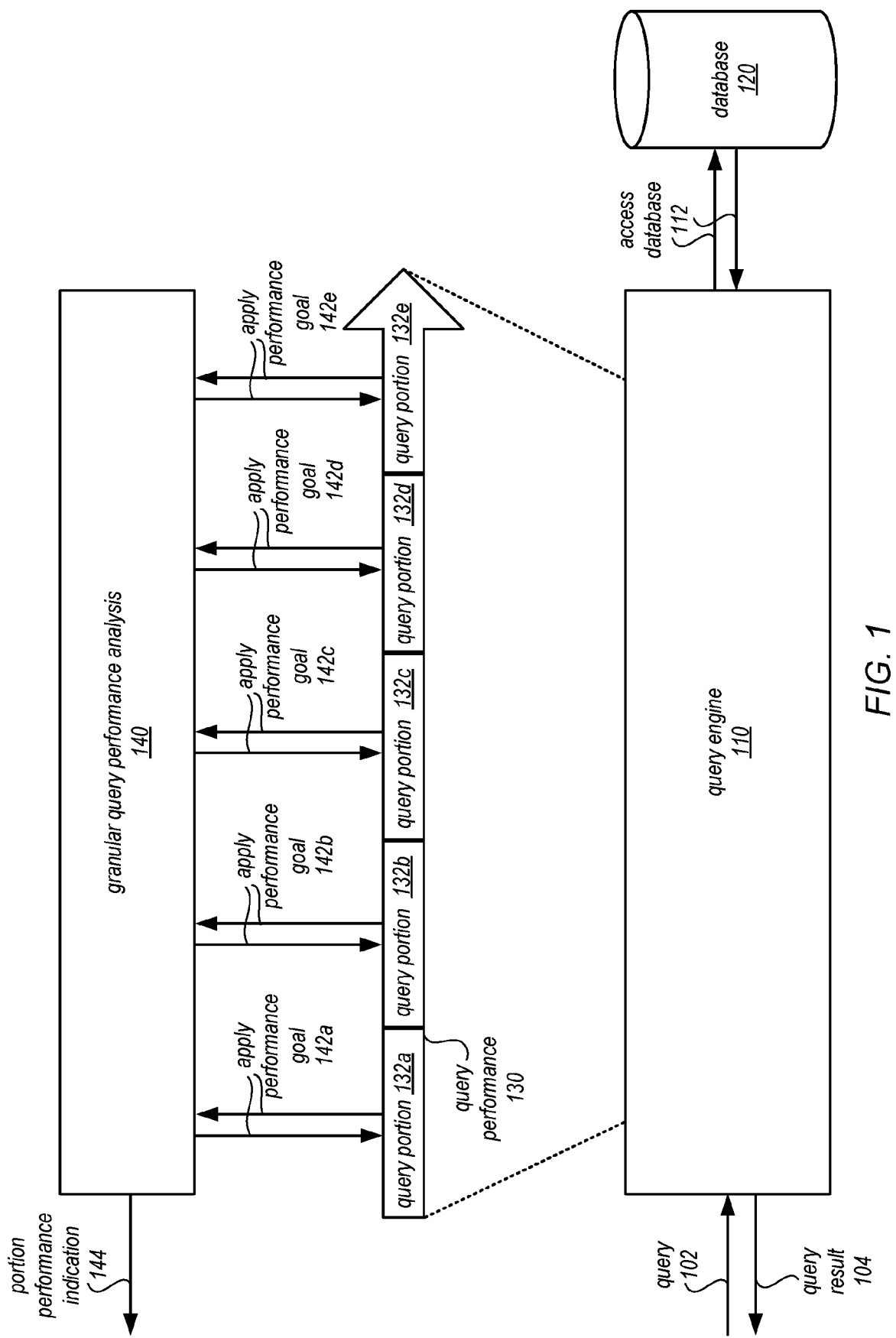
FIG. 1 illustrates a logical block diagram of granular performance analysis for database queries, according to some embodiments.

FIG. 1 illustrates a logical block diagram of granular performance analysis for database queries, according to some embodiments. Query engine 110 may be a query engine implemented to process access requests or other queries 102, accessing 112 a database 120 towards which the queries may be directed, and providing a query result 104 in return or in response, in some embodiments. Database 120 may be one or more data objects (e.g., tables) stored in a data store (e.g., a one or multiple storage nodes, storages systems, storage hosts, or storage devices) in structured (e.g., relational) or non-structured (e.g., NoSQL) fashion, in some embodiments. In some embodiments, database 120 may be stored in one or more storage devices that are remote (e.g., via a network connection across one or more network hops) or local (e.g., directly attached storage devices to a system, such as computing system 1000 in FIG. 9 implementing a query engine such as query engine 110).

The performance of a query may involve various operations, tasks, steps, features, waiting or idle periods, or other units or portions of executing a query in order to provide query result 104, in various embodiments. Metrics indicating the performance of the portions of a query's performance may be collected in order to provide granular performance analysis for database queries, in some embodiments. For example, the performance of query 102 may be illustrated as query performance 130 in FIG. 1, which may be divided into different portions, including query portions 132a, 132b, 132c, 132d, and 132e. Metrics corresponding to the different portions 132 may be collected as query engine 110 performs query 102, including metrics spanning an entire system stack for performing queries (e.g., metrics indicating or describing the performance of query engine subsystems, communication between nodes in a distributed database, operating system and other performance environments, virtualization layers (e.g., machine or operating system), and other network communications (e.g., between clients submitting query 102 and query engine 110), in some embodiments.

Granular query performance analysis 140 may be implemented as part of a database management system or separately to implement granular query performance analysis for query 102, in some embodiments. Granular query performance analysis 140 may identify whether a query, such as query 102 should be analyzed, in some embodiments. For example, latency or other overall performance measurements for query 102 may be evaluated with respect to a set of criteria for an event that triggers granular performance analysis of query 102 (e.g., latency of query 102 is greater than X time), in some embodiments. In some embodiments, machine learning techniques may be implemented to build a model (e.g., using regression techniques) that evaluates query performance attributes related to the query, data distribution, cluster, and database component runtimes to classify whether a query is sub-optimally performing and should have granular analysis performed. For identified queries, such as query 102 that may trigger granular performance analysis (or for all queries, in some embodiments), granular query performance analysis 140 may apply performance goals, such as performance goals 142a, 142b, 142c, 142d, and 142e, to the respective query portions 132 to determine whether the query portions 132 meet or exceed the performance goals 142, in some embodiments. For example, as discussed below with regard to FIGS. 5, 6, and 8, a critical path of units of work or other query portions may be identified and performance goals as described by performance models for the units of work may be evaluated for the units or work or other query portions to determine whether one or more of the units of work or other query portions exhibits abnormal behavior. Performance goals 142 may be particular to the corresponding portion of 132 of query performance 130 to which they are applied. For example, query portion 132a may be described by performance metrics that indicate the performance of establishing a connection between a client and query engine 110 and submitting query 102. Performance goal 142a may provide thresholds, measures, or other criteria which can indicate whether a problem in establishing a connection or receiving a query is slowing performance of query 102, in one embodiment.

Granular query performance analysis of database queries may provide more accurate insight into the conditions or other causes of query performance than performance metrics for a query overall, in some embodiments. For example, granular query performance analysis 140 may provide a portion performance indication 144 for those portions that do not meet or exceed the applied performance goals. The indication 144 may be provided to a user via an interface or to a remediation or other system control, providing the user or remediation system with the opportunity to take corrective action to improve the performance of query 102 the next time it is submitted (or for other queries submitted to query engine 110 which may perform similar work for the identified portion and thus may exhibit the same problematic or anomalous behavior), in some embodiments, as discussed below with regard to FIGS. 3 and 8.

Please note that the previous description of granular performance analysis for database queries is a logical illustration and thus is not to be construed as limiting as to the implementation of a query engine, database, granular query performance analysis, query performance, or portions thereof, or other illustrated features. For example, although query performance 130 is illustrated in serial fashion for performing different portions of the query, various portions of the query may be performed in parallel (e.g., in a cluster architecture similar to that discussed below with regard to FIG. 4).

This specification begins with a general description of a provider network that implements database services, storage services, and other services that may implement granular performance analysis for database queries. Then various examples of one such service, a data warehouse service, including different components/modules, or arrangements of components/module that may be employed as part of implementing the techniques are discussed. A number of different methods and techniques to implement granular performance analysis for database queries, some of which are illustrated in accompanying flowcharts. Finally, a description of an example computing system upon which the various components, modules, systems, devices, and/or nodes may be implemented is provided. Various examples are provided throughout the specification.

Figure 2:
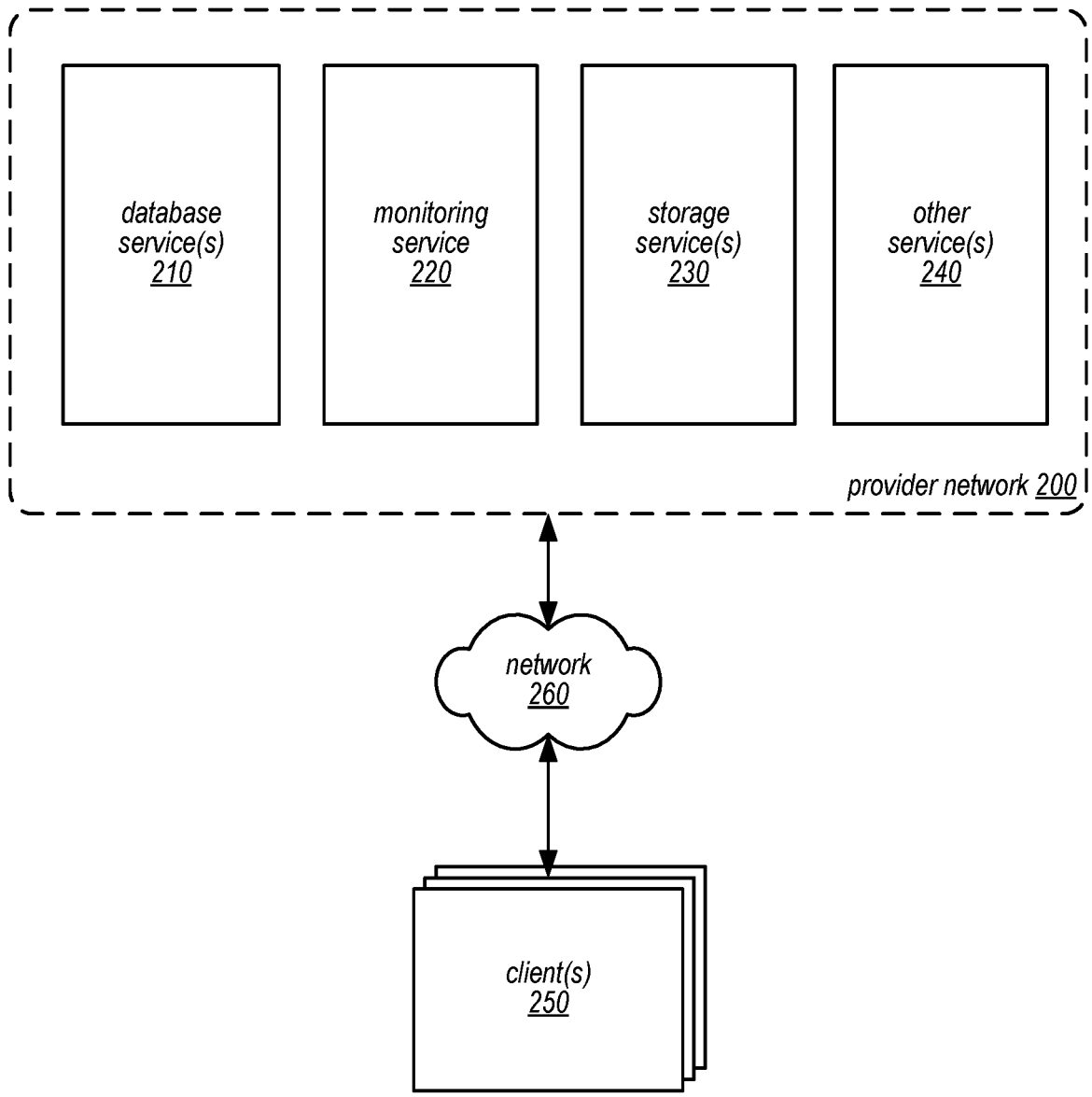
FIG. 2 is a logical block diagram illustrating a provider network offering a database service that implements of granular performance analysis for database queries to a database table hosted in the provider network, according to some embodiments.

FIG. 2 is a logical block diagram illustrating a provider network offering a database service that implements of granular performance analysis for database queries to a database table hosted in the provider network, according to some embodiments. Provider network 200 may be a private or closed system or may be set up by an entity such as a company or a public sector organization to provide one or more services (such as various types of cloud-based storage) accessible via the Internet and/or other networks to clients 250, in one embodiment. Provider network 200 may be implemented in a single location or may include numerous data centers hosting various resource pools, such as collections of physical and/or virtualized computer servers, storage devices, networking equipment and the like (e.g., computing system 1000 described below with regard to FIG. 9), needed to implement and distribute the infrastructure and services offered by the provider network 200, in one embodiment. In some embodiments, provider network 200 may implement various computing resources or services, such as database service(s) 210 or other data processing services, (e.g., a map reduce service, a data warehouse service, and other large scale data processing services), monitoring service 220, data storage services 230 (e.g., object storage services or block-based storage services that may implement a centralized data store for various types of data), and/or any other type of network based services 240 (which may include a virtual compute service and various other types of storage, processing, analysis, communication, event handling, visualization, data cataloging, data ingestion (e.g., ETL), and security services not illustrated), in some embodiments.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 9 and described below, in one embodiment. In various embodiments, the functionality of a given system or service component (e.g., a component of database service(s) 210, monitoring service 220, storage service 230, or other service(s) 240) may be implemented by a particular node or may be distributed across several nodes. In some embodiments, a given node may implement the functionality of more than one service system component (e.g., more than one data store component).

Database services 210 may be various types of data processing services that perform general or specialized data processing functions (e.g., analytics, big data querying, or any other type of data processing operation) over data that is fully structured data, in some embodiments. For example, in at least some embodiments, database services 210 may include various types of database services (e.g., relational) for storing, querying, and updating data. Such services may be enterprise-class database systems that are scalable and extensible. Queries may be directed to a database in database service(s) 210 that is distributed across multiple physical resources, as discussed below with regard to the example data warehouse service FIG. 3, and the database system may be scaled up or down on an as needed basis, in one embodiment. The database system may work effectively with database schemas of various types and/or organizations, in different embodiments. In some embodiments, clients/subscribers may submit queries or other requests (e.g., requests to add data) in a number of ways, e.g., interactively via an SQL interface to the database system. In other embodiments, external applications and programs may submit queries using Open Database Connectivity (ODBC) and/or Java Database Connectivity (JDBC) driver interfaces to the database system. As discussed in further detail below with regard to FIGS. 3-6, some database services may implement granular performance analysis of database queries, in some embodiments.

In some embodiments, database services 210 may include services that process requests to data that is not stored in fully structured storage (e.g., non-relational or NoSQL databases). Database services 210 may access the data that is semi-structured or not-structured in storage, such as data objects of unstructured or semi-structured data in data storage service 240, in one embodiment. In other embodiments, database services 210 may locally store, managed, and access semi-structured or not-structured data.

Provider network 200 may implement monitoring service 220, in various embodiments. Monitoring service 220 may collect and track metrics, collect and monitor log files, and/or evaluate metrics or logs to trigger alarms for various resources implemented in provider network 200 (e.g., resources in database services 210, storage services 230 or other services 240). Monitoring service 220 may automate responsive actions for alarms or other criteria specified for different resources, in some embodiments. As discussed below with regard to FIGS. 3-5, indications of whether portions of a query meet or exceed performance goals may be generated and provided for database queries. Monitoring service 220 may provide a user interface (e.g., a dashboard or other display) for displaying or otherwise providing the indications for individual queries or at varying levels of aggregation (e.g., aggregate query performance, database-level performance, and/or account level of performance).

Storage service(s) 230 may include various kinds of object or file data stores for putting, updating, and getting data objects or files, which may include data files of unknown file type, in some embodiments. Such data storage service(s) 230 may be accessed via programmatic interfaces (e.g., APIs), command line interfaces, and/or graphical user interfaces. Data storage service(s) 230 may provide virtual block-based storage for maintaining data as part of data volumes that can be mounted or accessed similar to local block-based storage devices (e.g., hard disk drives, solid state drives, etc.) and may be accessed utilizing block-based data storage protocols or interfaces, such as internet small computer interface (iSCSI), in some embodiments. Metrics collected may be stored for individual queries before evaluation and analysis in data storage service(s) 230, in some embodiments, as discussed below with regard to FIGS. 4 and 5.

Generally speaking, clients 250 may encompass any type of client that can submit network-based requests to provider network 200 via network 260, including requests for storage services (e.g., a request or other query to a database in database services 210, view or access metrics or query portion performance indications for a database in monitoring service 220, etc.). For example, a given client 250 may include a suitable version of a web browser, or may include a plug-in module or other type of code module that can execute as an extension to or within an execution environment provided by a web browser. Alternatively, a client 250 may encompass an application such as a database application (or user interface thereof), a media application, an office application or any other application that may make use of database services 210 or other network services 240 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that can interact directly with provider network 200. In some embodiments, client 250 may generate network-based services requests according to a Representational State Transfer (REST)-style network-based services architecture, a document- or message-based network-based services architecture, or another suitable network-based services architecture.

In some embodiments, a client 250 may provide access to provider network 200 to other applications in a manner that is transparent to those applications. For example, client 250 may integrate with an operating system or file system to provide storage on one of database service(s) 210 (e.g., a database table that stores data on behalf of the operating system or file system). However, the operating system or file system may present a different storage interface to applications, such as a conventional file system hierarchy of files, directories and/or folders. In such an embodiment, applications may not need to be modified to make use of the storage system service model. Instead, the details of interfacing to database service(s) 210 or other services 240 may be coordinated by client 250 and the operating system or file system on behalf of applications executing within the operating system environment. Similarly, a client 250 may be an analytics application that relies upon database services to execute various queries for data already ingested or stored in the database service 210 (e.g., such as data maintained in a data warehouse service, like data warehouse service 300 in FIG. 3 below) or data stored in a data lake hosted in other storage service(s) 240 that may be accessible to a query engine implemented as part of database service(s) 210).

Clients 250 may convey network-based services requests (e.g., access requests to read or write data may be via network 260, in one embodiment. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks, in one embodiment. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

Figure 3:
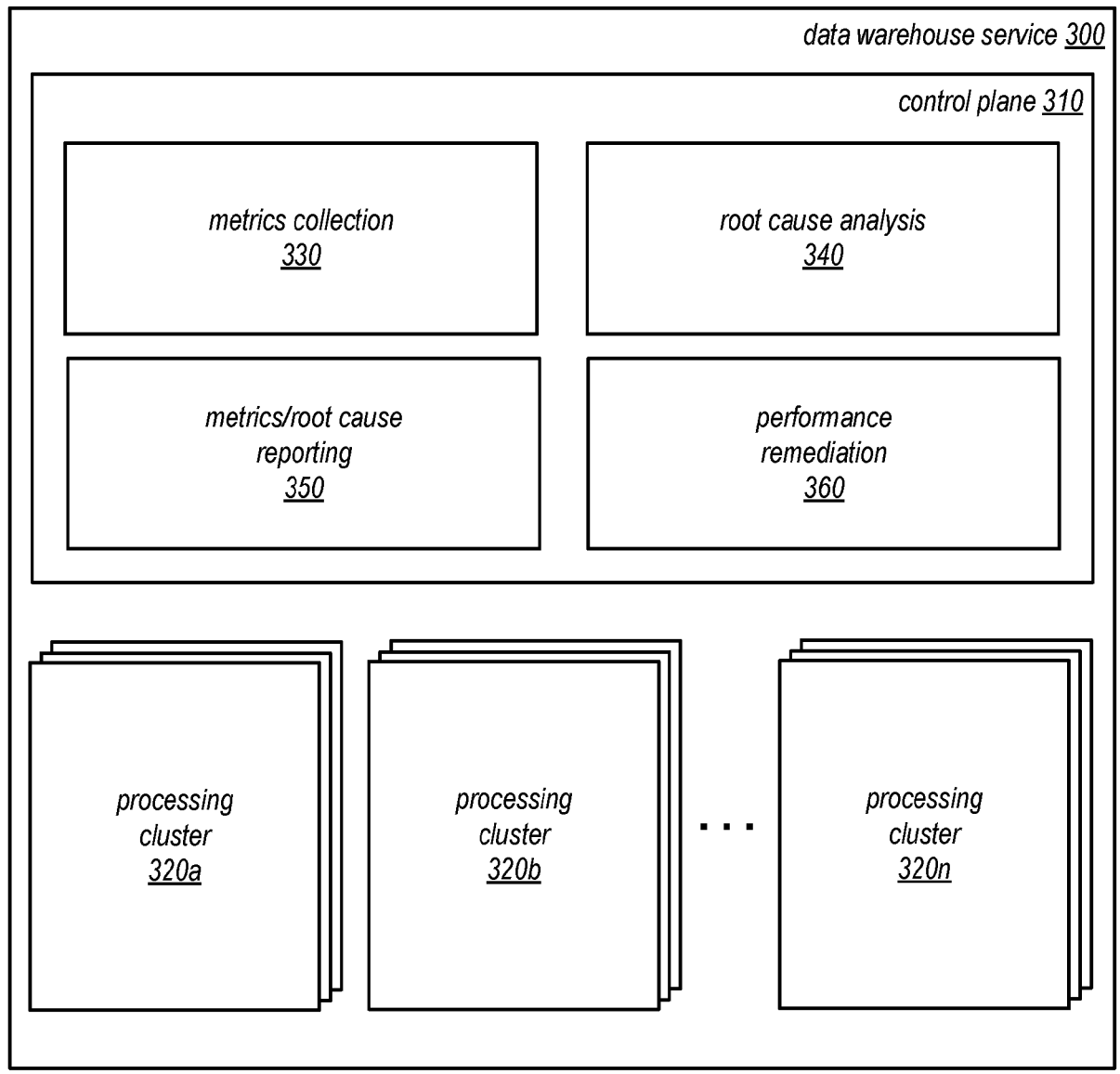
FIG. 3 is a logical block diagram of a data warehouse service that of granular performance analysis for database queries to a database table hosted in the data warehouse service, according to some embodiments.

In at least some embodiments, a database service 210 or data storage service 230 may be a data warehouse service. FIG. 3 is a logical block diagram of a data warehouse service that of granular performance analysis for database queries to a database table hosted in the data warehouse service, according to some embodiments. A data warehouse service, such as data warehouse service 300, may offer clients a variety of different data management services, according to their various needs. In some cases, clients may wish to store and maintain large of amounts data, such as sales records marketing, management reporting, business process management, budget forecasting, financial reporting, website analytics, or many other types or kinds of data, in one embodiment. A client's use for the data may also affect the configuration of the data management system used to store the data. For instance, for certain types of data analysis and other operations, such as those that aggregate large sets of data from small numbers of columns within each row, a columnar database table may provide more efficient performance, in one embodiment. In other words, column information from database tables may be stored into data blocks on disk, rather than storing entire rows of columns in each data block (as in traditional database schemes). The following discussion describes various embodiments of a column-oriented (sometimes referred to as "columnar") data warehouse system. However, various versions of the components discussed below as may be equally adapted to implement embodiments for various other types of database or data warehouse systems, such as row-oriented database systems. Therefore, the following examples are not intended to be limiting as to various other types or formats of structured data that may be stored, accessed, or otherwise managed by a data warehouse, like data warehouse service 300.

In some embodiments, storing table data in such a columnar fashion may reduce the overall disk I/O requirements for various queries and may improve analytic query performance. For example, storing database table information in a columnar fashion may reduce the number of disk I/O requests performed when retrieving data into memory to perform database operations as part of processing a query (e.g., when retrieving all of the column field values for all of the rows in a table) and may reduce the amount of data that needs to be loaded from disk when processing a query. Conversely, for a given number of disk requests, more column field values for rows may be retrieved than is necessary when processing a query if each data block stored entire table rows. In some embodiments, the disk requirements may be further reduced using compression methods that are matched to the columnar storage data type. For example, since each block contains uniform data (i.e., column field values that are all of the same data type), disk storage and retrieval requirements may be further reduced by applying a compression method that is best suited to the particular column data type. In some embodiments, the savings in space for storing data blocks containing only field values of a single column on disk may translate into savings in space when retrieving and then storing that data in system memory (e.g., when analyzing or otherwise processing the retrieved data).

Data warehouse service 300 may be implemented by a large collection of computing devices, such as customized or off-the-shelf computing systems, servers, or any other combination of computing systems or devices, such as the various types of systems 1000 described below with regard to FIG. 9, in some embodiments. Different subsets of these computing devices may be controlled by control plane 310. Control plane 310, for example, may provide a cluster control interface to clients or users who wish to interact with the processing clusters 320 managed by control plane 310. For example, control plane 310 may generate one or more graphical user interfaces (GUIs) for storage clients, which may then be utilized to select various control functions offered by the control interface for the processing clusters 320 hosted in the data warehouse service 300, in one embodiment. For example, as discussed below with regard to FIG. 8, a user may make adjustments to workload allocations, prioritization schemes, cluster size, network mappings or other operations or tasks for performing a query based on indications of which portions of a query's performance do not meet or exceed performance goals, in some embodiments.

In at least some embodiments, control plane 310 may implement metrics collection 330, which may track, store, organize or arrange performance metrics collected for queries performed at processing clusters 320. For example, metrics collection 330 may receive reported metrics from a leader node (as discussed below with regard to FIG. 4, and store them in a common storage location (e.g., in a file, direct, or object within storage service 230) for the database (or user account associated with the database). In some embodiments control plane 310 may implement root cause analysis 340, discussed in detail below with regard to FIGS. 5 and 6, in order to identify portions of query performance (e.g., units of work) that exhibit anomalous or other behavior that does not meet or exceed performance goals, in some embodiments. Control plane 310 may implement metrics/root cause reporting 350 which may access metrics collected by metrics collection 330 and root cause analysis results provided by root cause analysis 340 to report them to other services, such as monitoring service 350.

In some embodiments metrics/root cause reporting 350 may identify whether an anomalous portion of query performance can be corrected automatically and send a remediation request to performance remediation 360. In at least some embodiments, performance remediation 360 may be implemented as part of control plane 310 to provide automated corrective actions to resolve or improve the performance of portions of queries identified by root cause analysis 340. For example, cluster scaling, host restarts, host replacements, storage device replacements, or other remedial actions that cannot be taken by users of data warehouse service 300 may be tasked, directed, and/or performed by performance remediation 360, in some embodiments. In at least some embodiments, some or all of the illustrated features of control plane 310 for providing granular performance analysis for database queries may be implemented separately from control plane 310. For example, metrics collection 330, root cause analysis 340, and metrics/root cause reporting 350 may be implemented in a separate monitoring/analysis plane in order to isolate metrics collection and reporting from other failures that might bring down control plane 310.

As discussed above, various clients (or customers, organizations, entities, or users) may wish to store and manage data using a data warehouse service like data warehouse service 300, in some embodiments. Processing clusters may respond to various requests, including write/update/store requests (e.g., to add data into storage) or other queries for data (e.g., such as a Server Query Language request (SQL) for particular data), as discussed below with regard to FIG. 4, along with many other data management or storage services, in some embodiments. Queries may be directed to data that is locally hosted as part of data warehouse service 300 or stored elsewhere that is fully structured data or queries directed to data that is not-structured, such as log records, event data, or machine generated data stored in another storage service, in some embodiments.

Multiple users or clients may access a processing cluster to obtain data warehouse services, in one embodiment. In at least some embodiments, a data warehouse service 300 may provide network endpoints to the clusters which allow the clients to send requests and other messages directly to a particular cluster. Network endpoints, for example, may be a particular network address, such as a URL, which points to a particular cluster, in one embodiment. For instance, a client may be given the network endpoint "http://mycluster.com" to send various request messages to. Multiple clients (or users of a particular client) may be given a network endpoint for a particular cluster, in one embodiment. Various security features may be implemented to prevent unauthorized users from accessing the clusters, in some embodiments. Conversely, a client may be given network endpoints for multiple clusters, in one embodiment.

Processing clusters, such as processing clusters 320a, 320b, through 320n, hosted by the data warehouse service 300 may provide an enterprise-class database query and management system that allows users to send data processing requests to be executed by the clusters 320, such as by sending a data processing request to a cluster control interface implemented by the processing clusters, in some embodiments. Processing clusters 320 may perform data processing operations with respect to data stored locally in a processing cluster. Requests sent to a processing cluster 320 may be directed to local data stored in the processing cluster, in one embodiment. Therefore, processing clusters may implement local data processing to plan and execute the performance of requests or other queries with respect to local data in the processing cluster in one embodiment. In some embodiments, the processing clusters may access or send processing instructions to data that is stored remote from the processing clusters, such as data stored in another service.

Processing clusters 320 may allow users of data warehouse service 300 to perform data warehouse functions, such as fast querying capabilities over structured data, integration with various data loading and ETL (extract, transform, and load) tools, client connections with best-in-class business intelligence (BI) reporting, data mining, and analytics tools, and optimizations for very fast execution of complex analytic queries such as those including multi-table joins, sub-queries, and aggregation, more efficiently, in various embodiments. Control plane 310 may direct scaling operations to right-size a processing cluster 320 for efficiently processing queries.

Figure 4:
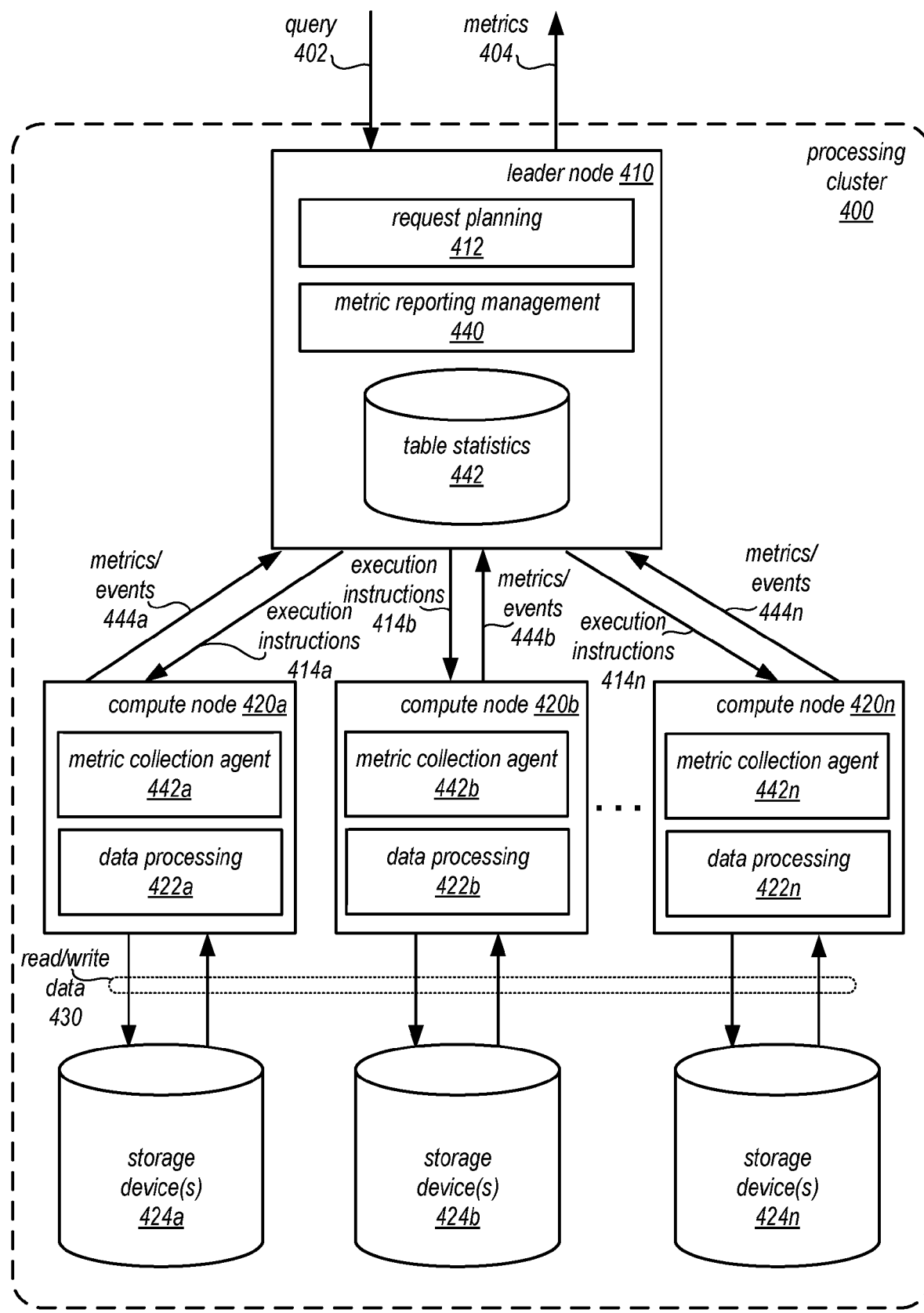
FIG. 4 is a logical block diagram illustrating a processing cluster of a data warehouse service, according to some embodiments.

FIG. 4 is a logical block diagram illustrating a processing cluster of a data warehouse service, according to some embodiments. Processing cluster 400 may be data warehouse service cluster, like processing clusters 320 discussed above with regard to FIG. 3, or another processing cluster that distributes execution of a query among multiple processing nodes, in one embodiment. As illustrated in this example, a processing cluster 400 may include a leader node 410 and compute nodes 420a, 420b, and 420n, which may communicate with each other over an interconnect (not illustrated), in one embodiment. Leader node 410 may implement request planning 412 to generate plan(s) and instructions 414 for executing queries, such as query 402, on processing cluster 400, in one embodiment. Leader node 410 may implement metric reporting management 440 to collect and report performance metrics collected for various events, units of work, or other portions a query's performance, in some embodiments. As described herein, each node in a processing cluster 400 may include attached storage, such as storage device(s) 424a, 424b, and 424n, on which a database (or portions thereof) may be stored on behalf of clients (e.g., users, client applications, and/or storage service subscribers), in one embodiment.

Note that in at least some embodiments, data processing capability may be separated from compute nodes, and thus in some embodiments, additional components may be implemented for processing requests. Additionally, it may be that in some embodiments, no one node in processing cluster 400 is a leader node as illustrated in FIG. 4, but rather different nodes of the nodes in processing cluster 400 may act as a leader node or otherwise direct processing of requests to data stored in processing cluster 400, in one embodiment. While nodes of processing cluster may be implemented on separate systems or devices, in at least some embodiments, some or all of processing cluster may be implemented as separate virtual nodes or instance on the same underlying hardware system (e.g., on a same server).

In at least some embodiments, processing cluster 400 may be implemented as part of a data warehouse service, as discussed above with regard to FIG. 3, or another service (e.g., database service(s) 210, storage service(s) 220, or other data processing service(s)). Leader node 410 may manage communications with clients, such as clients 250 discussed above with regard to FIG. 2, in one embodiment. For example, leader node 410 may be a server that receives an access request (e.g., a query for data or a request to add data) 402 from various client programs (e.g., applications) and/or subscribers (users), then parses them and develops an execution plan (e.g., query plan(s)) to carry out the associated database operation(s).

Leader node 410 may develop the series of steps necessary to obtain results for query 402, in one embodiment. Query 402 may be a query directed to a database table that is stored within processing cluster 400 (e.g., at one or more of compute nodes 420), in one embodiment. Leader node 410 may also manage the communications among compute nodes 420 instructed to carry out database operations for data stored in the processing cluster 400, in one embodiment. For example, node-specific request instructions 414 may be generated or compiled code that is distributed by leader node 410 to various ones of the compute nodes 420 to carry out the steps needed to perform access request 402, including executing the code to generate intermediate results of access request 402 at individual compute nodes that may be sent back to the leader node 410, in one embodiment. Leader node 410 may receive data and responses or results from compute nodes 420 in order to determine a final result for access request 402, in one embodiment. A database schema, data format and/or other metadata information for the data stored among the compute nodes, such as the data tables stored in the cluster, may be managed and stored by leader node 410 or obtained from a separate store (e.g., a data catalog service), in some embodiments. Request planning 412 may include the generation and selection of a query plan to perform access requests 402, in some embodiments.

Processing cluster 400 may also include compute nodes, such as compute nodes 420a, 420b, and 420n. Compute nodes 420, may for example, be implemented on servers or other computing devices, such as those described below with regard to computer system 1000 in FIG. 9, and each may include individual query processing "slices" defined, for example, for each core of a server's multi-core processor, one or more data processing engine(s), such as data processing 422a, 422b, and 422n, to execute the instructions 414 or otherwise perform the portions of the request plan assigned to the compute node, in one embodiment. Data processing 422 may access a certain memory and disk space in order to process a portion of the workload for a query (or other database operation) that is sent to one or more of the compute nodes 420. Data processing 422 may access attached storage, such as 422a, 422b, and 422n, to perform operation(s), in one embodiment. For example, data processing 422 may scan data in attached storage 424, access indexes, perform joins, semi joins, aggregations, or any other processing operation assigned to the compute node 420, in one embodiment. Compute nodes 420 may send intermediate or final results from requests back to leader node 410 for final result generation (e.g., combining, aggregating, modifying, joining, etc.). Data, such as a database table, may be partitioned or otherwise distributed across the storage device(s) 424 as different partitions or shards of the data, in some embodiments. Compute nodes 420 may receive instructions specific to the shard(s) or partition(s) of the data to which the compute node 420 has access.

Storage device(s), such as storage devices 424a, 424b, and 424n, may be implemented as one or more of any type of storage devices and/or storage system suitable for storing data accessible to the compute nodes, including, but not limited to: redundant array of inexpensive disks (RAID) devices, disk drives (e.g., hard disk drives or solid state drives) or arrays of disk drives such as Just a Bunch Of Disks (JBOD), (used to refer to disks that are not configured according to RAID), optical storage devices, tape drives, RAM disks, Storage Area Network (SAN), Network Access Storage (NAS), or combinations thereof. In various embodiments, disks may be formatted to store database tables (e.g., in column oriented data formats or other data formats).

Compute nodes 420 may implement metrics collection agents, such as metrics collection agents 442a, 442b, and 442n in order to obtain the various performance metrics that may be collected for performing granular performance analysis for database queries. Metrics may be collected separately or independently from the receipt of execution instructions or reporting results of instructions, in some embodiments. For example, metrics collection agents 442 may communicate metrics and events, such as metrics/events 444a, 444b, and 444n respectively back to metric reporting manager using a non-blocking programmatic interface (e.g., API) that may expose a model for instrumentation of metrics and events, such as a key-value pair model or nested key-value pair model, in some embodiments. A key-value model may allow for measurements of complex events (e.g., metrics of all steps in a segment of a query), in some embodiments. For example, each metric or event could have a timestamp, and an event can have zero or more metrics, in some embodiments. The API could be invoked or called from instrumentation points across different units of work in the database, such as those discussed below with regard to FIG. 6.

In some embodiments, the metrics/event reporting interface may implement ordered, non-blocking semantics (e.g., by using a non-blocking first-in-first-out (FIFO) multi-producer single consumer (MPSC) queue). Such a queue could reside in the shared memory so that database instrumentation for many different units of work can be written via the interface, in some embodiments. Producers of metrics or events may acquire a lock to serialize writes to the queue, in some embodiments.

Metrics collection agent 442 may obtain objects from the queue and send them as metrics/events 444 to metric reporting management 440 (e.g., in FIFO order per-agent), in some embodiments. Metric reporting management 440 may implement a queue to receive and store the objects in received order, in some embodiments. Metric reporting management 440 may consumes queue objects, translate them into other reporting formats (e.g., Javascript Object Notation (JSON) strings, which could be nested, and report the metrics 404 (e.g., to metrics collection 330 or to other storage locations, such as another database or other data store in data storage services 230). In some embodiments, metrics may be reported for individual events, operations, and/or per-query. In some embodiments, batch processing may be performed to collected metrics for multiple queries before reporting them 404. In some embodiments, metrics may not be query-specific by describe the context or environment for query processing, in some embodiments. In some embodiments, metric reporting management 440 or another metric reporting agent (not illustrated) may collect, determined, or otherwise obtain metrics for various portions or units of work performed at leader node 410. For example, leader node 410 may perform data processing to accomplish various operation such as joins (e.g., distributed hash joins) in order to join table results received from different compute nodes 420. Metrics corresponding to the data processing work (or other work such as generating instructions to send to compute nodes 420) may be measured and evaluated as discussed below, in some embodiments.

Some metrics may be stored or reported for ongoing queries in order to support real time views of system and query state, in some embodiments. Completed query metrics may support historic views, in some embodiments. In some embodiments, metric reporting management 440 (or metrics collection 330) may maintain an index with the query id timeline. In some embodiments, metric reporting management 440 (or metrics collection 330) may record non-query context (e.g., asynchronous instrumentation which may identify the metrics that are descriptive of the environment, such as host resource utilization indicating contention with other applications or work being performed concurrently with a query, like work to perform other received queries) into a separate timeline file.

Deserialization and processing of monitoring objects may be performed asynchronously and by a process outside data processing 422 in order to provide fault isolation, in some embodiments. The metrics collection agents 442 processes may be forked by the data processing 422 in order to access to a shared memory pool, in some embodiments. In some embodiments, metrics/events 444 may be reported directly to metrics collection 330 or an intermediary storage/communication system (e.g., a message bus service that provides data streams).

Figure 5:
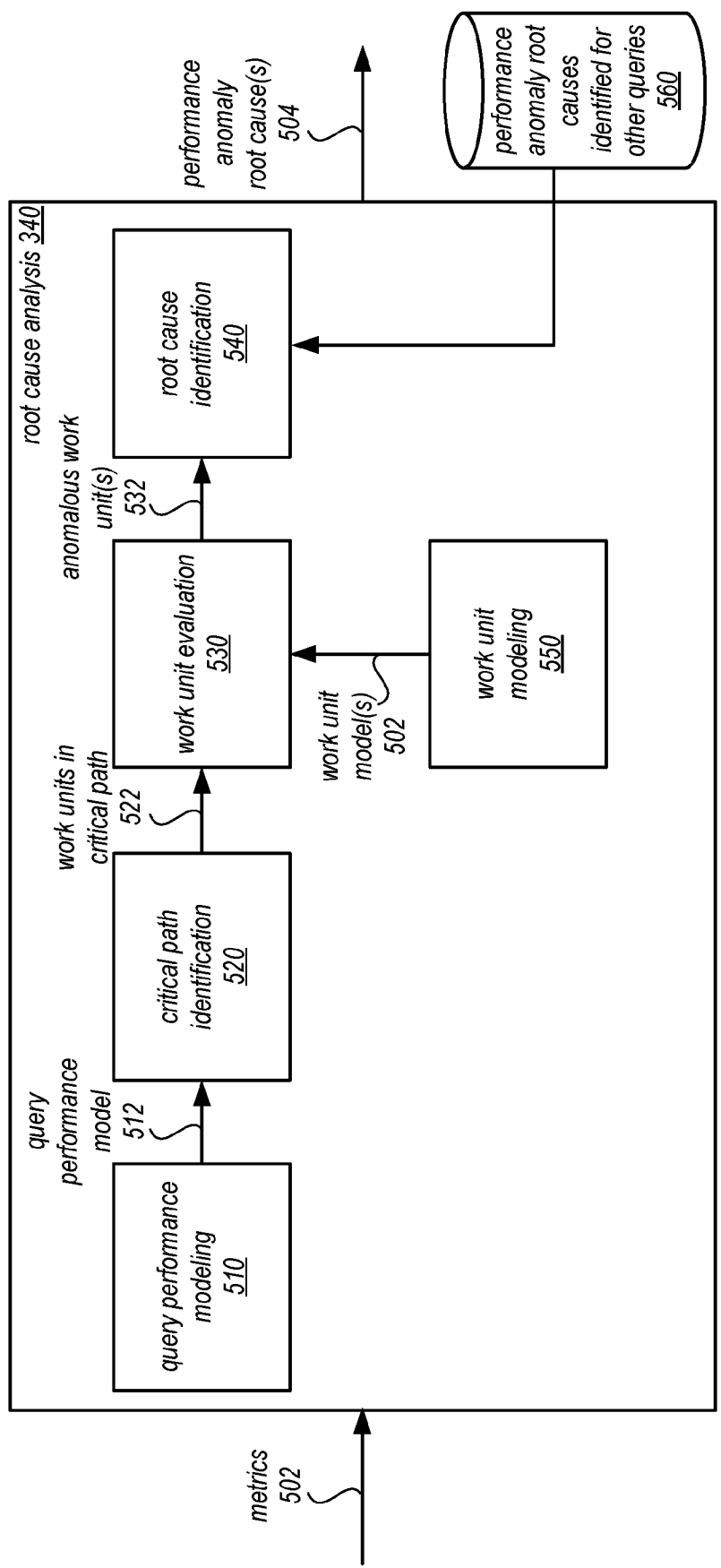
FIG. 5 is a logical block diagram illustrating root cause analysis of performance abnormalities for queries to a table in the data warehouse service, according to some embodiments.
Figure 6:
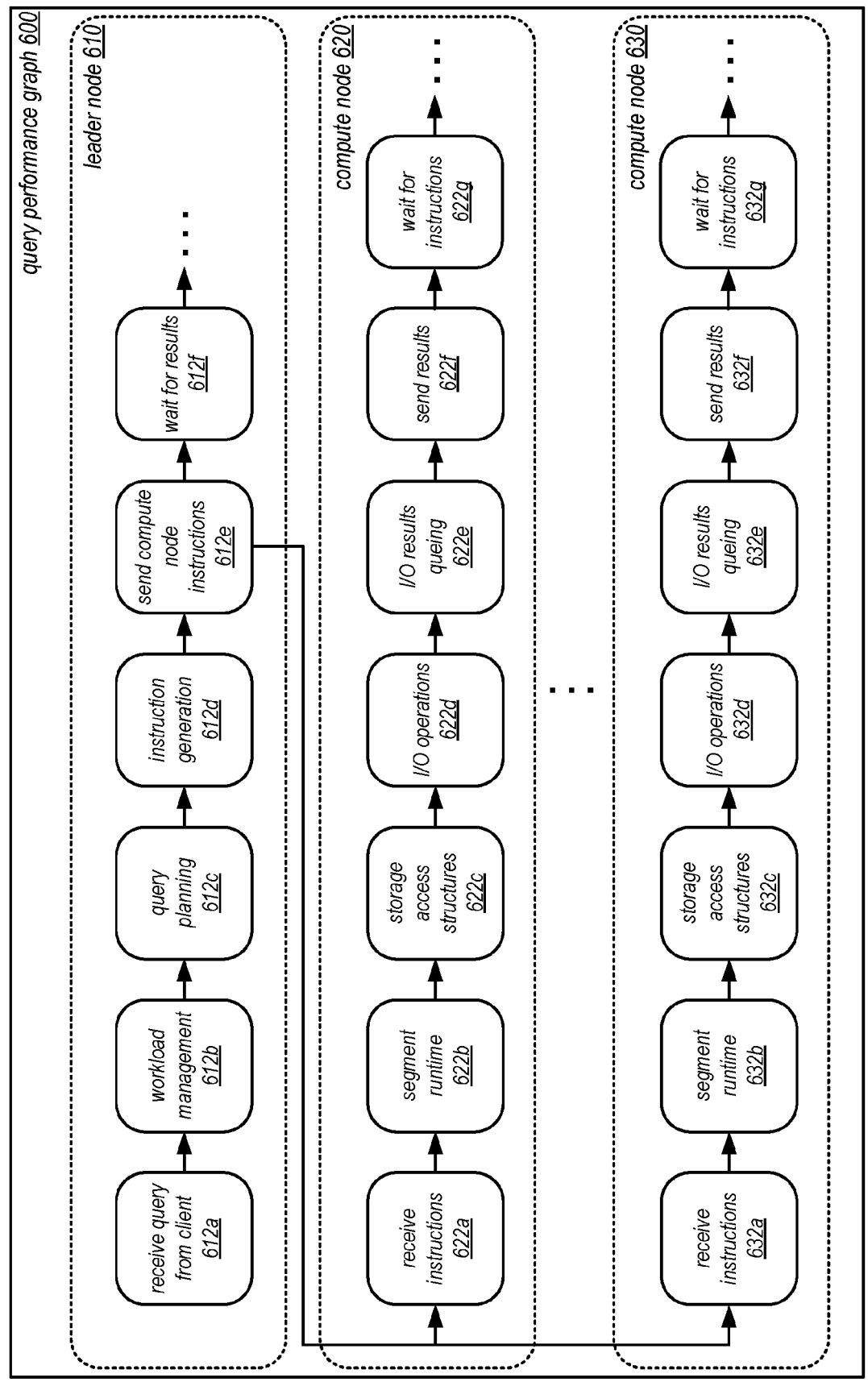
FIG. 6 is a logical block diagram illustrating a query performance graph for measuring and evaluating portions of a query with respect to performance goals, according to some embodiments.

FIG. 5 is a logical block diagram illustrating root cause analysis of performance abnormalities for queries to a table in the data warehouse service, according to some embodiments. Root cause analysis 340 may access, obtain, or otherwise receive performance metrics 502 in order to identify root causes for performance anomalies for different portions of query performance, in some embodiments. Root cause analysis 340 may implement query performance modeling 510 in order to maintain and/or generate a graph or other structure of query performance for instrumenting metrics collection and analysis. FIG. 6 is a logical block diagram illustrating a query performance graph for measuring and evaluating portions of a query with respect to performance goals, according to some embodiments.

Query performance graph 600 may identify the various portions (e.g., units of work and idle time) that may be modeled in order to provide a granular analysis of query performance, in some embodiments. In one embodiment, query performance graph 600 may be represented as a directed acyclic graph, where each node may represent a unit of work done during query performance or an idle period. The edges between nodes may represent causality between the units of work, in one embodiment. A lack of causality (i.e., either a direct edge of a directed path) between node A and node B, for example, may imply that node A and node B executed in parallel (though not necessarily at the same wallclock time) on the cluster, in some embodiments. Note, however, that other structures for identifying the instrumentation of monitoring query performance may also be used, and thus a graph is not intended to be limiting, in some embodiments.

Query performance graph 600 may include many different portions (e.g., units of work and idle time) in order to perform a query, which may (or may not) be the same for different queries performed at a cluster, in some embodiments. In some embodiments, query performance graph 600 may indicate the portions assigned to a leader node, such as leader node portions 610, or compute nodes, such as compute node portions 620 or 630. Examples of portions may include a portion for receiving a query from a client 612, workload management 612b, query planning 612c, instruction generation 612d, sending compute nodes instructions 612e, and waiting for results from compute nodes 612f, among other possible portions that may be included. Similarly, compute node portions may include receiving instructions, 622 and 632a, segment runtime 622b and 632b, storage access structures (e.g., queues, caches, or locks) 622c and 632c, I/O operations 622d and 632d, I/O results queuing 622e and 632e, sending results to the leader node or other compute nodes 622f and 632f, and waiting for more instructions 622g and 632g, among other possible portions that may be included.

Although not illustrated in FIG. 6, the query processing environment may also create hidden causal relationships that may necessitate additional nodes in the query performance model, in some embodiments. For example, queries can see performance problems in scenarios when CPU cores are fully utilized impacting CPU-bound query segments, a cache evicts a previously warmed up data that a query read because of other cache workload, or cross-traffic in the network reduces join tuple throughput to a compute node executing a join. In order to capture hidden causality, additional nodes may be inserted into the query performance graph 600 by query performance modeling 510 to identify the hidden environmental causes for measurement and analysis with respect to query performance.

Root cause analysis 340 may implement critical path identification 520, taking the query performance model 512 for a query and identifying the work units in the critical path for evaluation, in some embodiments. As discussed below with regard to FIG. 8, the critical path may be determined according to latency or idle time, in some embodiments. For the identified work units in the critical path 522, root cause analysis 340 may implement work unit evaluation 530 to apply work unit model(s) 502 (received from work unit modeling 550 in some embodiments, to determine whether work units in the critical path do not meet or exceed performance goals for the work units (e.g., exhibiting anomalous behavior).

Work unit modeling 550 may generate, maintain, and/or update various work unit models for different types of work that may be applied to different portions (e.g., units of work) for performing a query, in some embodiments. For example, work units that involve or are determined by buffers, queues, or locks, a work unit model for buffers, queues and locks may be utilized in some embodiments. The queue, for instance, is a common abstraction used in databases for maintaining shared resource pools and messages for inter-process communication (IPC), in some embodiments. Databases may use locks to serialize tasks, in some embodiments. These types of work may be modeled or represented in metrics by a queue or a lock using a waits-for graph, in some embodiments, whose nodes are query steps (e.g., query id, step id tuples) and whose edges encode wait (e.g., blocking) relationships between query executions. In the context of a query, a waiting unit of work may includes all queries that the query being analyzed waited for, and the amount of time spent those queries took to finish after the query arrived, in some embodiments. Performance goals for this type of work unit model may be an evaluation to see whether or not a query has to wait to be served in a queue or acquire a lock in excess of a threshold amount (e.g., greater than zero), in some embodiments. If the queue is not work conserving, then the wait time may include queue sleep periods, in some embodiments.

Another type of work unit that may be modeled are work units that describe cache behavior, in some embodiments. Cache misses in the database buffer pool can impact query performance, in some embodiments. In addition to capturing metrics to measure the overall throughput for a caching work unit, the average throughput by cache hits and misses metrics, along with an estimate of miss rate, may also be collected and/or determined, in some embodiments. Performance goals for this type of work unit model may be a threshold for the cache hit rate, and lower bound thresholds for cache hit and miss throughputs, in some embodiments.

Another type of work unit that may be modeled are work units that describe communication layers and protocols, in some embodiments. Communication layers and TCP protocols may use flow control to change the sending rate according to observed end-to-end network and receiver-side behavior, in some embodiments. Both communication layers and TCP may maintain a send window of size $W(t)$, which may be upper-bound by the receiver window $R(t)$, in some embodiments. The communication layers and TCP may send $W(t)$ worth of packets in a protocol Round-Trip Time ($RTT(t)$), in some embodiments. Delayed or lost packets (either in the network or end-hosts) may impact $W(t)$, in some embodiments. For example, if W(t) is constant, which may be the case with the communication layer, then throughput may be: T(t) = min (W(t),R(t))/RTT(t), in some embodiments. In the case of TCP, W(t) may follow a sawtooth curve, and thus an approximation for bulk-transfer throughput may be: T(t) = k /[RTT(t)√(p(t))], where k may be constant and p(t) may be the packet loss probability, in some embodiments.

In some embodiments, to evaluate units of work for communication layers and TPC, RTT, packet loss rate and the two window sizes may be collected as a per-packet time-series. Because the packet rate can be very high, the work unit model may generate a time series of averages (or rates in case of loss), and record that as a metric, in some embodiments.

Performance goals for this type of work unit model may be a baseline for throughput that could be estimated using either equation-based modeling or empirical modeling (i.e., compare with the distribution across the data warehouse service 300 for flow byte size), in some embodiments. Note that the communication layer can incur latencies in responding with ACKs, in some scenarios. This can be measured at the receiver side and piggybacked to the sender in the header (while checking for processing delays that add significantly to the round trip time (RTT)), in some embodiments.

Another type of work unit that may be modeled are work units that describe storage devices or systems (e.g., disk behavior), in some embodiments. For example, a disk (e.g., hard disk drive (HDD) or solid state drive (SSD)) may be modeled as a queue with a cache in front, in some embodiments. The queue may hold read/write operations (each requiring accessing one or more sectors), in some embodiments. The queue may not be FIFO, in some embodiments, as operations can be merged based on sector locality. HDD queues may have a single server, in some embodiments, while SSD queues may have a large (potentially infinite servers), in some embodiments. Operations may be served by a single server at a sector rate (throughput) that is a function of disk type (HDD vs. SSD), in some embodiments. Operations that hit the disk cache can be served at rates much higher than sector rates (e.g., 1 Gpbs), in some embodiments. The disk may be idle if there are no ongoing operations, in some embodiments. However, the queue modeling the disk would start to fill up if the incoming sector rate is higher than service sector rate, in some embodiments.

Degraded or anomalous disk performance may be detected based on one or more metrics, in some embodiments. An estimated disk throughput metric that is independent of the system load (e.g., evaluating how fast the disk seeks and reads/writes sectors), based on: disk stats and the ratio of bytes read/written to the time spent in those operations, in some embodiments. Samples below minimum load on disk (i.e., the disk spends at least a fraction of the sampling interval) may be filtered out, in some embodiments. An estimated total waiting time metric (queueing + service latency) may be determined, in some embodiments. The waiting time may be high due to high load λ (and higher than service rate μ), or high service rate, in some embodiments. Sector error metrics detected failed disk operations, in some embodiments.

If the disks are idle, the metrics may not be observable, in some embodiments. Some disks are shared between two or more databases, in some embodiments. For shared disks, the workload metrics may not reflect the total workload, in some embodiments. If a shared disk is saturated due to workload of another database, throughput and waiting time metrics at instance-level would be underestimated, in some embodiments. However, under sufficient workload from queries, the metrics may still be accurate in identifying degraded disks, in some embodiments. In some embodiments, if a disk is idle, test work or other operations can be performed to measure the performance of the disk (e.g., collecting metrics indicating throughput for the test work, such as test reads or writes) and evaluate the measured performance to determine if the disk satisfies a performance goal.

Performance goals for this type of work unit model may be evaluated according to a throughput and/or waiting time are defined based on hardware characteristics of the storage device (e.g., HDD type, SSD type), in some embodiments.

Another type of work unit that may be modeled are work units that describe network behavior, in some embodiments. A low transfer throughput between nodes could be a result of either pathological communication layer or TCP protocol behavior or the network path performance, in some embodiments. A network path may be measured as a sequence of queues with a finite buffer size, in some embodiments. If a queue is full, incoming packets are dropped, in some embodiments If a queue is non-empty, incoming packets will experience queueing delays, in some embodiments. In addition to queueing delays, network transmissions may incur propagation (distance) and transmission (packet size-dependent) latencies, in some embodiments. In order to separate communication layer issues from network (both host interface and network itself), lightweight active probing of the network path between all node pairs may be performed, in some embodiments. The probing may be a mix of low frequency ICMP pings (e.g., latency and packet loss metrics over 100 packets) and/or short bulk-transfer tests (e.g., throughput metrics over a number of seconds), in some embodiments. Performance goals for this type of work unit model may be a baseline or threshold value for the network metrics described above (which may be determined or updated by work unit modeling 550), in some embodiments.

In some embodiments, compute nodes and or leader nodes may execute in a virtualized environment on a host server or system. Another type of work unit that may be modeled are work units that describe the virtualization environment, in some embodiments. The virtualization environment may be within an instance or within co-located instances, which can impact query performance as the virtualization environment may starve queries of resources (e.g., noisy neighbor scenarios), in some embodiments. The virtualization environment may be modeled as wait-for relationships, in some embodiments. To capture metrics, a background thread that periodically captures CPU utilization per-core, memory and paging activity, network interface counters (bytes, packets, errors), and disk input workloads may be implemented, in some embodiments. In this way, periods when the underlying infrastructure is high on resource usage (e.g., above some threshold value), then anomalous behavior can be detected, in some embodiments.

Work unit evaluation 530 may apply the above example work unit models 502 (or others) to the metrics 502 captured for the work units, to identify anomalous work units 532 that do not meet or exceed the performance goals (e.g., thresholds, criteria, etc.) specified for the work units, in some embodiments. Root cause identification 540 may provide some, none, or all of the anomalous work units as root causes for query performance, in some embodiments. In some embodiments, knowledge-based selection techniques for ranking or classifying the anomalous work units may be implemented. For example, a knowledge base may identify three work units identified as anomalous as caused the anomalous performance of the first one of the anomalous work unit in the critical path and may only provide an indication of the one anomalous work unit. A knowledge base may rank the different anomalous work units according to a work unit ordering and only select or indicate that the top X anomalous units are root causes of query performance. In some embodiments, identified root causes for different queries may be stored or aggregated (e.g., for a snapshot of time, previous 6 hours, 24 hours, 1 week, etc.). The most frequently identified root causes of query performance for queries performed within this time period may be determined and provided (e.g., in response to a request from a user that specifies the time window, cluster, database, or other information to identify what root causes to include in the response), in some embodiments. For example, the response could indicate the top three root causes identified for queries in the last 6 hours (though other root causes may also have been identified if less frequently).

Root cause identification 540 may rely on and or provide root cause identifications 504 based on root cause identified for other queries 560 (e.g., to the same database), in some embodiments. If, for example, the same anomalous work unit is identified for several queries for the database, then root cause identification 540 may indicate the root causes 504 having a greater confidence that it is impacting query performance (a confidence level that may not be satisfied based on the results of one query alone), in some embodiments.

In at least some embodiments, machine learning techniques may be implemented to find statistically significant "hints" on root causes of query performance problems. For example, an ordered time sequence of recent events (and metrics) leading to an anomalous query can be evaluated and compared with other queries with known anomalies, in some embodiments. In some embodiments, a cluster of metrics (or work unit anomalies) detected at the time of the anomalous query execution can be recognized using cluster-based machine learning techniques (e.g., that project or represent metrics in hyperspace for distance and other similarity-based analysis), in some embodiments. Note that these mined patterns may be correlational and may not causal, in some embodiments.

Although root cause analysis 340 has been illustrated as being performed within control plane 310, in some embodiments, some or all of the various features described above may be implemented elsewhere. For example, leader node 410 in FIG. 4, may perform one or multiple portions of metrics collection and/or root cause analysis as discussed above, in some embodiments.

Figure 7:
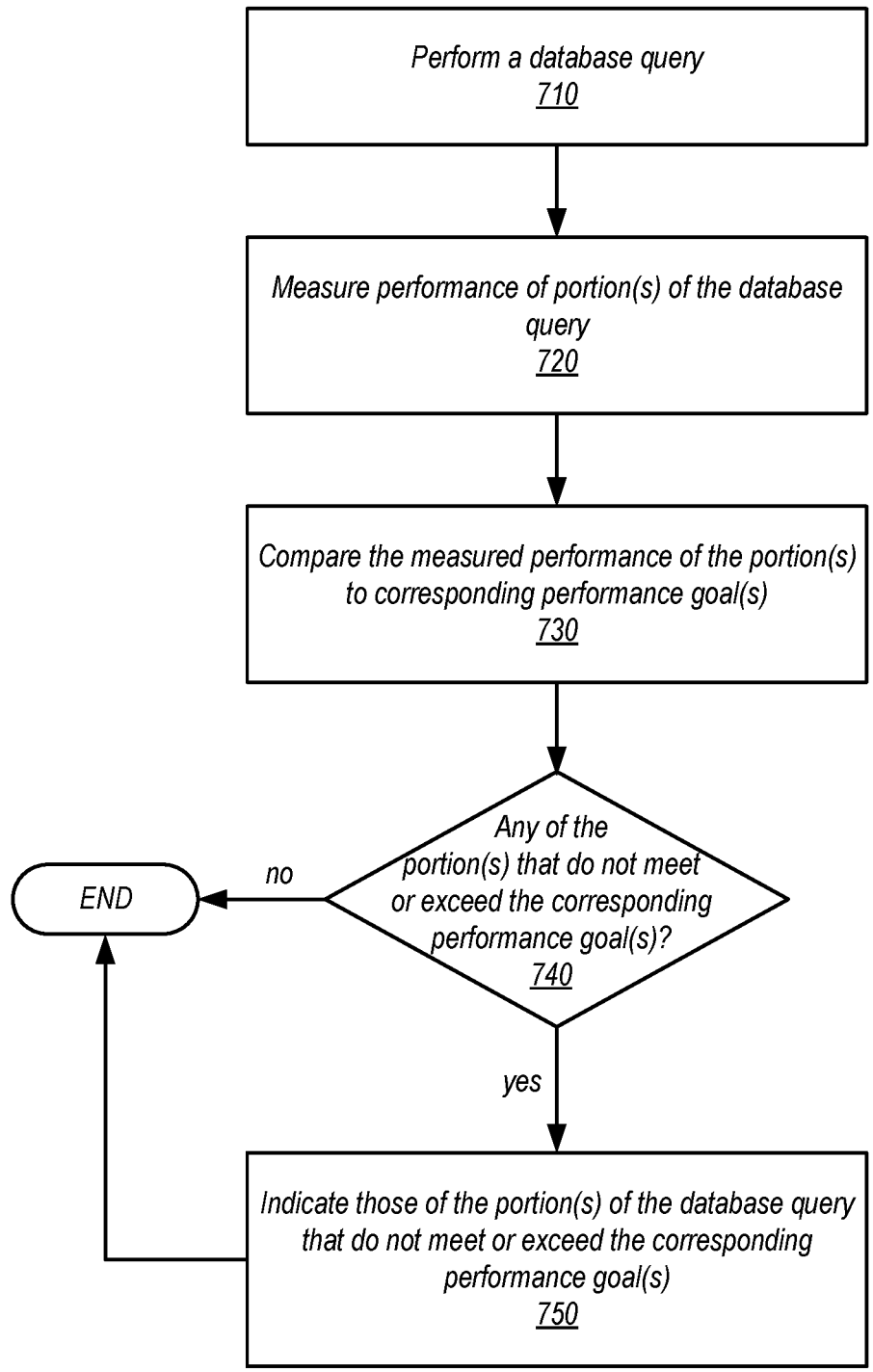
FIG. 7 is a high-level flowchart illustrating methods and techniques to implement granular performance analysis for database queries, according to some embodiments.

Although FIGS. 2 - 6 have been described and illustrated in the context of a provider network implementing different services, like data warehousing service 300, the various components illustrated and described in FIGS. 2 - 6 may be easily applied to other data processing or storage systems that perform queries to databases. As such, FIGS. 2 - 6 are not intended to be limiting as to other embodiments of granular perform analysis for database queries. FIG. 7 is a high-level flowchart illustrating methods and techniques to implement granular performance analysis for database queries, according to some embodiments. Various different systems and devices may implement the various methods and techniques described below, either singly or working together. For example, a processing cluster, control plane component, or other analysis component, such as described above with regard to FIGS. 4 - 6, may implement the various methods. Alternatively, a combination of different systems and devices. Therefore, the above examples and or any other systems or devices referenced as performing the illustrated method, are not intended to be limiting as to other different components, modules, systems, or configurations of systems and devices.

As indicated at 710, a database query may be performed, in some embodiments. A client may submit a query to a database engine, such as leader node, or non-distributed database, in some embodiments, to perform the query. As indicated at 720, while performing the query, performance of the query may be measured for portions of the database query, in some embodiments. For example, various metrics relating to performance of different events, operations, waiting periods, or other ones of the units of work may be collected. In some embodiments, the same metrics may be collected for the performance of each received query and may only be selectively evaluated for performance goals, as discussed below with regard to FIG. 8, for those units or work, wait times, or hidden causes of query performance that are identified for a query according to a query graph or other structure.

In some embodiments, a triggering event or condition may identify a query for analysis. For example, the latency of a query may be compared with a threshold latency value. In some embodiments, random selection may select queries for evaluation (e.g., in order to spot check whether triggering events for granular query analysis are catching queries with sub-optimal performance). As indicated at 730, the measured performance of the portion(s) may be compared to corresponding performance goal(s), in some embodiments. Performance goals, as discussed above, may include various criteria with respect to the different portions of queries to which they correspond, in some embodiments, which can be evaluated with respect to the metrics collected indicating the performance of the portions of the query. Consider the example work unit models discussed above. The caching latency thresholds, or network flow analysis discussed above may be examples of performance goals applicable to corresponding performance goals. Those portion(s) that do not meet or exceed the corresponding performance goal(s) for the portions of the query may indicated, as indicated at 750, in some embodiments. For example, as discussed below remedial actions that are automatically performed may be triggered based on the indicated portions or a user may be notified via a user interface so that user changes or remedial actions can be performed, in some embodiments. As indicated by the negative exit from 740, some database queries may satisfy the performance goal(s) and thus may not result in an indication being provided, in some embodiments.

Figure 8:
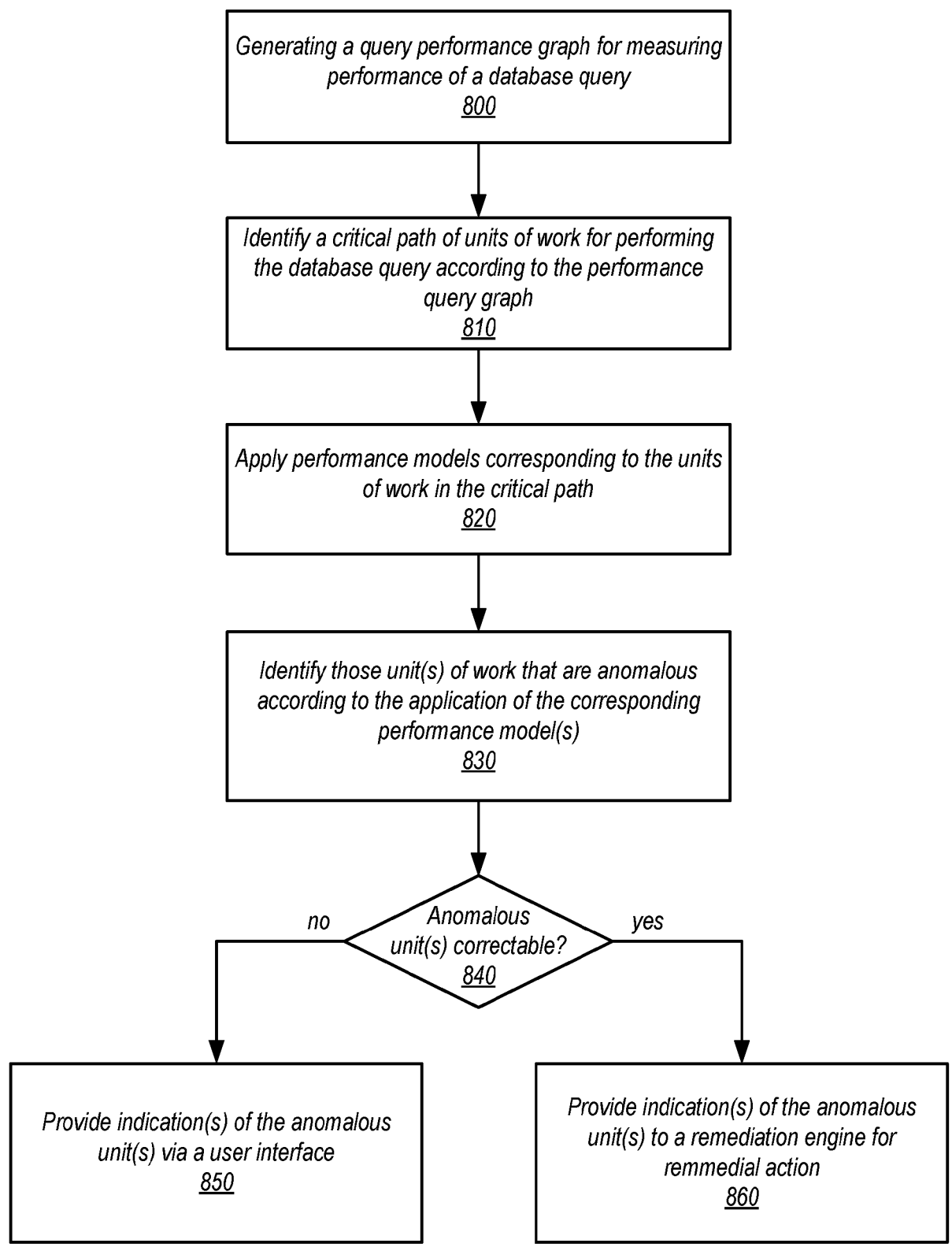
FIG. 8 is a high-level flowchart illustrating methods and techniques to apply performance models to units of work in a critical path for a database query in order to provide of granular performance analysis for the database query, according to some embodiments.

FIG. 8 is a high-level flowchart illustrating methods and techniques to apply performance models to units of work in a critical path for a database query in order to provide of granular performance analysis for the database query, according to some embodiments. As indicated at 800, a query performance model may be generated, in some embodiments, for measuring performance of the query. Like the example discussed above with regard to FIG. 6, the query performance model may indicate units of work (including wait time), idle time, or other information describing the performance of a query for performance analysis. Causality may be represented as a directed graph, as discussed above, or according to other ordering information schemas, in some embodiments. The query performance model may be generated to include both units of work directly in the execution path and units of work representative of hidden forces upon query performance, as discussed above. In some embodiments, the query performance model may be generated from a template that is modified for different queries so that the model is not generated from scratch. In some embodiments, the query model is statically defined for a query (or for multiple queries).

As indicated at 810, a critical path of units of work for performing a database query may be determined, according to some embodiments. For example, all of the nodes in a performance query graph involved in the longest latency path (or the path with the most idle time) may be in the critical path for performing the query.

As indicated at 820, performance models corresponding to the units in the critical path may be applied, in some embodiments. As discussed above with regard to FIG. 5, various types of performance models may be applicable to model or understand the behavior of different units of work. Communicating instructions, for instance, may involve protocol metric collection, network metric collection, and/or lock/queue evaluation, as discussed above, in some embodiments. As indicated at 830, those unit(s) of work that are anomalous according to the application of the corresponding performance model(s) may be identified, in some embodiments. Selection techniques that rank the anomalous units of work may be applied, as discussed above with regard to FIG. 5, in order to choose a subset of anomalous units of work to indicate or act upon.

As indicated at 840, a determination may be made as to whether the anomalous units are correctable, in some embodiments. For correctable anomalous units, indications of the anomalous units may be to a remediation engine for remedial action, as indicated at 860, in some embodiments. For example, anomalous units may be classified as user correctable based on the possible remediation actions that could be taken, in one embodiment. For anomalous units that are not correctable, provide indication(s) of the anomalous unit(s) via a user interface, as indicated at 850, in some embodiments. Similar to the example above, some anomalous units may be classified as automatically remediable based on possible remediation actions, in one embodiment.

The methods described herein may in various embodiments be implemented by any combination of hardware and software. For example, in one embodiment, the methods may be implemented by a computer system (e.g., a computer system as in FIG. 9) that includes one or more processors executing program instructions stored on a computer-readable storage medium coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Embodiments of granular performance analysis for database queries as described herein may be executed on one or more computer systems, which may interact with various other devices. One such computer system is illustrated by FIG. 9. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions that execute on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

Figure 9:
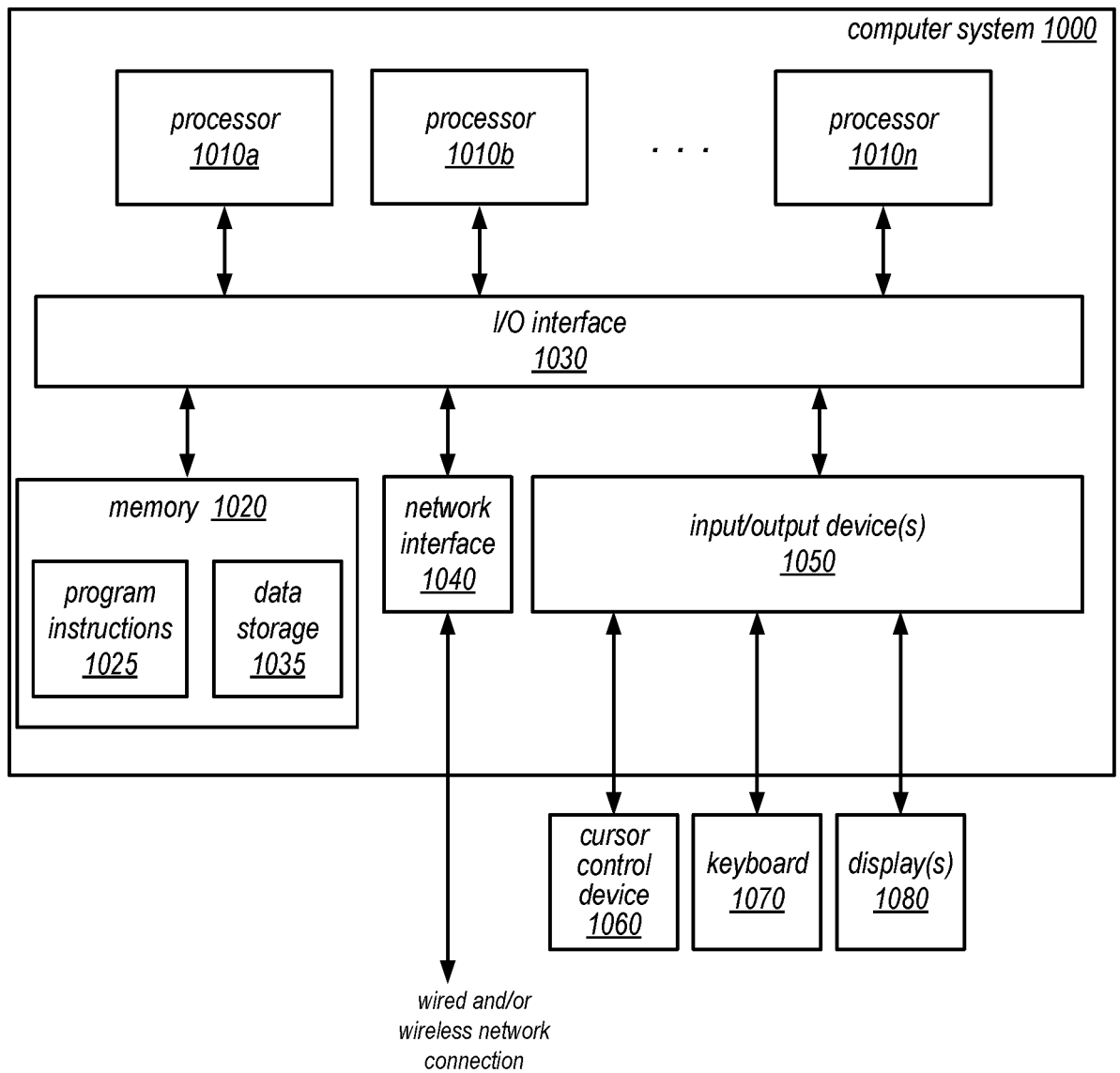
FIG. 9 illustrates an example system to implement the various methods, techniques, and systems described herein, according to some embodiments.

As shown in FIG. 9, memory 1020 may include program instructions 1025, that implement the various methods and techniques as described herein, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
  at least one processor; and
  a memory that stores program instructions that when executed by the at least one processor, cause the at least one processor to:
    collect metrics of database query performance for a previously performed database query by a query engine, wherein the database query comprises a plurality of different portions, and wherein the metrics describe the database query performance of respective units of work of the plurality of units of work that perform respective portions of the database query;
    generate a directed graph of the database query performance, wherein the graph comprises a plurality of nodes, wherein each of the plurality of nodes represents different ones of the plurality of units of work, wherein the graph comprises edges between the plurality of nodes that represent causality between the units of work;
    determine, for the database query, a critical path along respective ones of the edges through two or more of the plurality of nodes of the graph according to an idle time of critical path;
    for those respective units of work corresponding to the two or more nodes of the determined critical path, compare the metrics of the those respective units of work to one or more corresponding performance goals for the respective units of work according to an application of respective models for those respective units of work;
    identify an anomalous unit of work of those units of work corresponding to the two or more nodes of the determined critical path according to a determination from the comparison that the anomalous unit of work does not meet or exceed the one or more corresponding performance goals;
    determine the anomalous unit of work as a root cause of a performance anomaly for the database query, wherein the determination is based, at least in a part, on a frequency in which the anomalous unit of work is identified as a root cause for performance anomalies in a plurality of database queries; and
    provide an indication of the performance anomaly for the portion of the database query performance, wherein the indication identified the root cause of the performance anomaly of the database query performance.

2. The system of claim 1, wherein the program instructions further cause the at least one processor to insert an additional node into the graph that represents a hidden force on the database query performance.

3. The system of claim 1, wherein to provide the indication of the performance anomaly for the portion of the database query performance, the program instructions cause the at least one processor to:
  select the anomalous unit of work from a larger set of anomalous units of work of the database query that do not meet or exceed corresponding performance goals for the larger set of anomalous units of work according to a ranking of the anomalous units of work in larger set.

4. The system of claim 1, wherein the at least one processor is implemented as part of a data warehouse service offered by a provider network, wherein a database targeted by the database query is hosted in the data warehouse service, and wherein the indication of the performance anomaly for the portion of the database query performance is provided via user interface implemented as part of a monitoring service for the provider network.

5. A method, comprising:
  collecting metrics of database query performance for a previously performed database query, wherein the database query comprises a plurality of different portions, and wherein the metrics describe the database query performance of respective units of work of the plurality of units of work that perform respective portions of the database query;
  generating a graph of the database query performance, wherein the graph comprises a plurality of nodes, wherein each of the plurality of nodes represent different ones of the plurality of units of work, wherein the graph comprises edges between the plurality of nodes that represent causality between the units of work;
  determining, for the database query, a critical path along respective ones of the edges through two or more of the plurality of nodes of the graph according to an idle time of the critical path;
  for those respective units of work corresponding to the two or more nodes of the determined critical path, comparing the respective metrics of those repective units of work to one or more corresponding performance goals for the respective units of work according to an application of the respective models for those respective units of work;
  identifying an anomalous unit work of those units of work corresponding to the two or more nodes of the determined critical path as a cause of a performance anomaly of the database query according to a determination from the comparison that the anomalous unit of work does not meet or exceed the one or more corresponding performance goals and a frequency in which the anomalous unit of work is identified as a root cause for performance anomalies in a plurality of database queries; and
  indicating the performance anomaly of the database query performance, wherein the indicating identifies the root cause of the performance anomaly of the database query performance.

6. The method of claim 5, further comprising inserting an additional node into the graph that represents a hidden force on the database query performance.

7. The method of claim 6, wherein the graph is a directed acyclic graph.

8. The method of claim 5, wherein the indicating the performance anomaly of the database query performance comprises selecting the anomalous unit of work from a larger set of anomalous units of work of the database query that do not meet or exceed corresponding performance goals for the larger set of anomalous units of work according to a ranking of the anomalous units of work in the larger set.

9. The method of claim 5, further comprising:
before comparing the respective performance metrics of those respective units of work to the one or more corresponding performance goals for the respective units of work:
evaluating the database query performance to detect an event that causes performance of the comparing.

10. The method of claim 5, wherein one of those units of work is evaluated according to wait time, wherein measuring the performance of the one unit of work comprises one or more metrics that indicate an amount of wait time for the database query performance at the one unit of work, and wherein comparing the measured performance of the portion comprises determining whether the amount of wait time for the one unit of work is less than or equal to a threshold wait time, wherein exceeding the threshold indicates that the portion does not meet or exceed the corresponding performance goal.

11. The method of claim 5, wherein one of those units of work accesses a cache, wherein measuring the performance of the one unit of work comprises one or more metrics that indicate a cache hit rate, and wherein comparing the measured performance of the one unit of work comprises determining whether the cache hit rate for the one unit of work meets or exceeds a threshold cache hit rate.

12. The method of claim 5, wherein indicating the at least one portion of the database query as the performance anomaly of the database query comprises indicating the at least one portion of the database query via a user interface.

13. The method of claim 5, wherein the collecting, the generating, the determining, the measuring, the comparing, and the indicating are performed by one or more nodes of a processing cluster of a network-based database service.

14. A non-transitory, computer-readable storage medium, storing program instructions that when executed by one or more computing devices cause the one or more computing devices to implement:
collecting metrics indicating database query performance for a previously performed database query, wherein the database query comprises a plurality of different portions, and wherein the metrics indicate the database query performance of respective units of work of the plurality of units of work that perform respective portions of the database query;
generating a graph of the database query performance, wherein the graph comprises a plurality of nodes, wherein each of the plurality of nodes represent different ones of the plurality of units of work, wherein the graph comprises edges between the plurality of nodes that represent causality between the units of work;
determining, for the database query, a critical path along respective ones of the edges through two or more of the plurality of nodes of the graph according to an idle time of the critical path;
for those respective units of work corresponding to the two or more nodes of the determined critical path, comparing the respective metrics of those respective units of work to one or more corresponding performance goals for the respective units of work according to an application of respective models for those respective units of work;
identifying an anomalous unit of work of those units of work corresponding to the two or more nodes of the determined critical path as a root cause of a performance anomaly of the database query according to a determination from the comparison that the anomalous unit of work does not meet or exceed the one or more corresponding performance goals and a frequency in which the anomalous unit of work is identified as a root cause for performance anomalies in a plurality of database queries; and
indicating the performance anomaly of the database query performance, wherein the indicating identifies the root cause of the performance anomaly of the database query performance.

15. The non-transitory, computer-readable storage medium of claim 14, wherein the program instructions cause the one or more computing devices to further implement inserting an additional node into the graph that represents a hidden force on the database query performance.

16. The non-transitory, computer-readable storage medium of claim 14, wherein the indicating the performance anomaly of the database query performance is performed as part of indicating a plurality of performance anomalies for performance of a plurality of database queries that do not meet or exceed corresponding performance goals.

17. The non-transitory, computer-readable storage medium of claim 14, wherein the program instructions cause the one or more computing devices to further implement:
before comparing the respective metrics of those respective units of work to the one or more corresponding performance goals:
evaluating the database query performance to detect an event that causes performance of the comparing the respective metrics of those respective units of work to the one or more corresponding performance goals.

18. The non-transitory, computer-readable storage medium of claim 14, wherein the comparison of the respective metrics to the corresponding performance goal for one of those units of work identifies a storage device with degraded performance.

19. The non-transitory, computer-readable storage medium of claim 14, wherein, in indicating the performance anomaly of the database query performance, the program instructions cause the one or more computing devices to implement sending a request to a remediation engine indicating the root cause of the performance anomaly.

20. The non-transitory, computer-readable storage medium of claim 14, wherein the one or more computing devices are implemented as part of a control plane for a database service offered by a provider network, and wherein the database service hosts a database that is the target of the database query.

* * * * *